US008515860B2

(12) United States Patent
Schweitzer (10) Patent No.: US 8,515,860 B2
(45) Date of Patent: Aug. 20, 2013

(54) SYSTEM, METHOD AND COMPUTER PROGRAM PRODUCT FOR PREPAID AND WIRELESS VOICE COMMUNICATION AND IP

(75) Inventor: Limor Schweitzer, Santa Clara, CA (US)

(73) Assignee: Amdocs (Israel) Ltd., Ra'Anana (IL)

( * ) Notice: Subject to any disclaimer, the term of this patent is extended or adjusted under 35 U.S.C. 154(b) by 4218 days.

(21) Appl. No.: 09/879,682

(22) Filed: Jun. 11, 2001

(65) Prior Publication Data

US 2001/0051931 A1    Dec. 13, 2001

Related U.S. Application Data

(60) Provisional application No. 60/210,966, filed on Jun. 12, 2000.

(51) Int. Cl.
*G06Q 40/00* (2012.01)
(52) U.S. Cl.
USPC .............................. 705/38; 705/35; 705/36 R
(58) Field of Classification Search
USPC ....................................................... 705/40, 38
See application file for complete search history.

(56) References Cited

U.S. PATENT DOCUMENTS

| | | | |
|---|---|---|---|
| 5,727,163 A | 3/1998 | Bezos | 705/27 |
| 5,757,917 A | 5/1998 | Rose et al. | |
| 5,794,221 A | 8/1998 | Egendorf | 705/40 |
| 5,825,881 A | 10/1998 | Colvin | 705/78 |
| 5,845,267 A | 12/1998 | Ronen | |
| 5,899,980 A | 5/1999 | Wilf et al. | |
| 5,905,736 A | 5/1999 | Ronen et al. | |
| 5,914,472 A * | 6/1999 | Foladare et al. | 235/380 |
| 5,991,749 A | 11/1999 | Morrill, Jr. | 705/44 |
| 6,012,088 A | 1/2000 | Li et al. | |
| 6,047,051 A | 4/2000 | Ginzboorg et al. | 379/130 |
| 6,125,352 A | 9/2000 | Franklin et al. | |
| 6,134,548 A | 10/2000 | Gottsman et al. | 707/5 |
| 6,141,404 A | 10/2000 | Westerlage et al. | 379/118 |
| 6,332,134 B1 | 12/2001 | Foster | |
| 6,359,976 B1 | 3/2002 | Kalyanpur et al. | 379/134 |
| 6,396,828 B1 | 5/2002 | Liu | 370/352 |

(Continued)

FOREIGN PATENT DOCUMENTS

| | | |
|---|---|---|
| EP | 0848361 | 6/1998 |
| WO | 99/30293 | 6/1999 |

(Continued)

OTHER PUBLICATIONS

Office Action from U.S. Appl. No. 09/879,681 mailed Sep. 20, 2005.

(Continued)

*Primary Examiner* — Kirsten Apple
(74) *Attorney, Agent, or Firm* — Zilka-Kotab, PC (57) ABSTRACT

A system, method and computer program product are provided for affording a digital wallet for Internet Protocol (IP) usage utilizing a wireless network. Initially, a request is received for a debit account. Such request includes payment for such debit account. In response to the request, the debit account is enabled. Payment for wireless network voice communication over a wireless network is then collected by billing against the debit account. Further, payment for IP usage is collected by billing against the debit account. Such IP usage is carried out using the wireless network.

36 Claims, 7 Drawing Sheets

(56) References Cited

U.S. PATENT DOCUMENTS

| | | | |
|---|---|---|---|
| 6,405,251 B1 | 6/2002 | Bullard et al. | 709/224 |
| 6,480,485 B1 | 11/2002 | Kari et al. | 370/352 |
| 6,608,832 B2 | 8/2003 | Forslow | 370/353 |
| 6,668,046 B1 | 12/2003 | Albal | 379/119 |
| 6,747,989 B1 | 6/2004 | Sevanto | 370/466 |
| 6,760,416 B1 | 7/2004 | Banks et al. | 379/114.01 |
| 6,760,417 B1 | 7/2004 | Wallenius | 379/114.28 |
| 6,868,391 B1 * | 3/2005 | Hultgren | 705/26 |
| 6,970,852 B1 | 11/2005 | Sendo et al. | |
| 7,006,993 B1 | 2/2006 | Cheong et al. | |
| 7,069,249 B2 | 6/2006 | Stolfo et al. | |
| 2001/0051931 A1 | 12/2001 | Schweitzer | 705/65 |
| 2001/0055291 A1 | 12/2001 | Schweitzer | 370/337 |
| 2002/0032800 A1 | 3/2002 | Puuskari et al. | 709/246 |
| 2004/0030657 A1 * | 2/2004 | Holm-Blagg et al. | 705/65 |

FOREIGN PATENT DOCUMENTS

| | | |
|---|---|---|
| WO | 9927556 A2 | 6/1999 |
| WO | 9933034 A1 | 7/1999 |
| WO | 99/62036 | 12/1999 |
| WO | 00/04476 | 1/2000 |
| WO | 00/72571 | 11/2000 |
| WO | 0197186 A2 | 12/2001 |
| WO | 0197554 A2 | 12/2001 |

OTHER PUBLICATIONS

Office Action from U.S. Appl. No. 09/879,681 mailed Jun. 30, 2005.
Office Action from U.S. Appl. No. 09/879,681 mailed Nov. 18, 2004.
Office Action from U.S. Appl. No. 09/879,683 mailed Jan. 13, 2006.
Stewart, John, "Connecting with Confidence", Web Techniques. San Francisco: Apr. 2000. vol. 5, Iss. 4; p. 84, 4 pgs.
Office Action Summary from U.S. Appl. No. 09/879,683 which was mailed on Dec. 28, 2006.
Office Action Summary from U.S. Appl. No. 09/879,683 mailed on Nov. 12, 2009.
Final Office Action from U.S. Appl. No. 09/879,683, dated May 5, 2006.
Final Office Action from U.S. Appl. No. 09/879,683, dated Jun. 26, 2007.
Written Opinion from International Application No, PCT/US01/18872, dated Sep. 28, 2005.
Ahuja, V., "Secure Commerce on the Internet." Academic Press, Inc., 1997, pp. 235-239.
Keizer, G., "Hammer Time," PC World.Com, Jun. 1, 2000, pp. 1-8.
McDonald, G., "Sold! How to Win at Web Auctions," PC World Online, Aug. 5, 1999, pp. 1-10.

* cited by examiner

SYSTEM, METHOD AND COMPUTER PROGRAM PRODUCT FOR PREPAID AND WIRELESS VOICE COMMUNICATION AND IP

RELATED APPLICATION(S)

The present application claims the priority of a provisional application filed Jun. 12, 2000 under Ser. No. 60/210,966, and which is incorporated herein by reference in its entirety. The present application is further related to a co-pending application filed concurrently herewith under the title "SYSTEM, METHOD AND COMPUTER PROGRAM PRODUCT FOR CHARGING FOR COMPETITIVE IP-OVER-WIRELESS SERVICES" and Ser. No. 09/879,681 and naming Limor Schweitzer as inventor, and a co-pending application filed concurrently herewith under the title "SYSTEM, METHOD AND COMPUTER PROGRAM PRODUCT FOR ALLOWING A CARRIER TO ACT AS A CREDIT-APPROVAL ENTITY FOR E-COMMERCE TRANSACTIONS" and Ser. No. 09/879,683 and naming Limor Schweitzer as inventor, which are each incorporated herein by reference in their entirety.

FIELD OF THE INVENTION

The present invention relates to wireless networks, and more particularly to prepaying for wireless network usage.

BACKGROUND OF THE INVENTION

Telecommunications network products are services provided by telephone companies that are carried out on telecommunications networks. A widely known example is dial-1 long-distance voice service which allows a customer to dial a 1 plus a ten digit number from his or her home telephone, talk to a party who answers the telephone on the line of the ten digit number dialed, and pay for the telephone call when billed at the end of the month. Although dial-1 is popular, other calling and payment options are sometimes preferable, such as the option to make a call from a phone other than the home phone and charge the call to the home phone account using a calling card.

One such calling and payment option is debit calling which is also referred to as prepaid calling. Debit calling allows a customer to put funds in an account and have those funds debited each time a telephone call is made. Standard debit call processing includes verification of the account balance prior to connecting the call and ongoing balance verification during the call. An example of a typical debit calling customer is a parent who purchases a debit calling card for a child away from home. Such debit calling is particularly prevalent in the wireless network environment.

The invention is a method and apparatus and will be described as applied to a cellular or wireless telephone and network of the (Global System for Mobile Communication (GSM) type. It should be understood however that the invention is not limited to such GSM cellular wireless network nor to telephones, but may find application elsewhere, wherever there is provision of services and/or goods which are paid for with prepaid smart cards or the like. For the GSM, a particular packet mode data transfer service GPRS (General Packet Radio Service) has been developed.

Figure 1A:
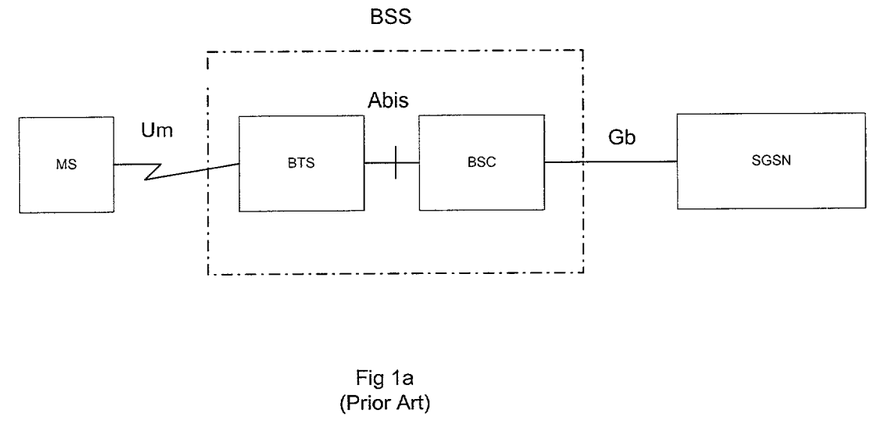
FIG. 1a shows a block diagram of principal components in the operation of a General Packet Radio Service (GPRS) system.

Prior art FIG. 1a shows a block diagram of principal components in the operation of the GPRS system. A packet switching controller SGSN (Serving GPRS Support Node) controls the operation of packet switching service on the cellular network side. The packet switching controller SGSN controls the sign-on and sign-off of the mobile station MS, the updating of the location of the mobile station MS and the routing of data packets to their correct destinations. The mobile station MS is connected to the base station subsystem BSS through a radio interface Um. The base station subsystem is connected to the packet switching controller SGSN through the BSS-SGSN interface Gb.

In the base station subsystem BSS, the base station BTS and the base station controller BSC have been connected to each other by a BTS-BSC interface Abis. The location of the packet switching controller SGSN in the mobile station network can vary, for example, according to which technical implementation is being used. Although in FIG. 1a, the packet switching controller SGSN has been marked outside the base station subsystem BSS, the packet switching controller SGSN can be placed, for example, as a part of the base station BTS connected to the base station subsystem BSS or as a part of the base station controller BSC.

Figure 1B:
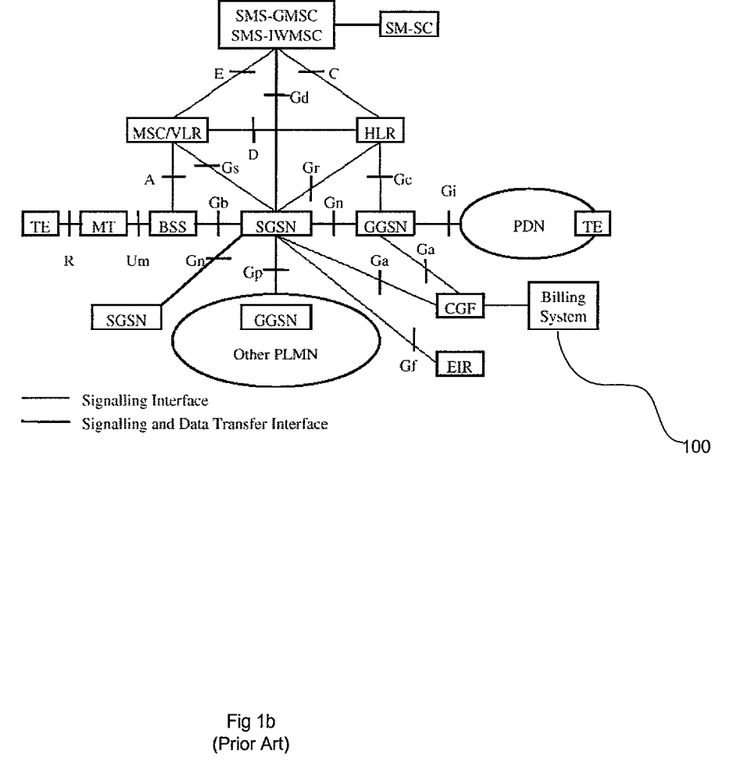
FIG. 1b illustrates a GPRS system including the various components discussed in FIG. 1a hereinabove in addition to other conventional components.

With the various components of a conventional GPRS system of FIG. 1a now described, a more comprehensive system will now be disclosed. In particular, Prior art FIG. 1b illustrates a GPRS system including the various components discussed in FIG. 1a hereinabove, i.e. SGSN, BSS, etc., in addition to other conventional components. For example, the GPRS system of FIG. 1b includes a packet switching controller GGSN (Gateway GPRS Support Node), Home Location Registers (HLRs), Mobile Switching Centers (MSC), Gateway Mobile Services Switching Center (GMSC), Equipment Identity Register (EIR), Mobile Telephone Network (PLMN), Pilot Directory Number (PDN), Switching Center/Visitor Location Register (MSC/VLR), etc.

In addition to the above components of FIG. 1b, a billing system 100 is included for charging customers for use of the GPRS system. Traditionally, such billing system 100 interfaces with a CGF (Charging Gateway Framework) which, in turn, interfaces with the SGSN and the GGSN via a conventional interface, Ga.

The prior art billing system 100 collects information from the GPRS equipment. Such information often takes the form of call description records (CDRs). CDRs traditionally provide a record of called numbers, and a date, time, length and so on of each telephone call. In use, the approach takes the GPRS CDRs, collects them into the CDF, does some processing (such as mapping call-start with call-end) and sends the CDRs to the billing system 100. This is done for the purposes of charging for wireless network voice communication using the debit billing account.

While such billing system 100 is ideal for charging for wireless network voice communication via a debit account, problems arise when the wireless network is used for data communication utilizing Internet Protocol (IP). The billing system 100 may use the debit account only for the amount of general wireless network voice communication, and cannot be used to administer payment based on any type of IP-specific usage.

There is therefore a need for a technique of using a debit account for IP usage in a wireless network environment.

DISCLOSURE OF THE INVENTION

A system, method and computer program product are provided for affording a digital wallet for Internet Protocol (IP) usage utilizing a wireless network. Initially, a request is received for a debit account. Such request includes payment for such debit account. In response to the request, the debit account is enabled. Payment for wireless network voice communication over a wireless network is then collected by billing against the debit account. Further, payment for IP usage is collected by billing against the debit account. Such IP usage is carried out using the wireless network.

In one embodiment of the present invention, the request may be received via a mobile cellular hand set, and the debit account may be enabled by a human operator. Payment may be received via a credit account. Further, the balance of the debit account may be updated in real-time.

As an option, an alert may be sent to a user upon the debit account falling below a predetermined amount. The wireless network voice communication and the IP usage may also be discontinued upon the debit account falling below a predetermined amount.

As an option, the wireless network voice communication may use the wireless network via a mobile cellular handset. Further, the wireless network voice communication may use Wireless Application Protocol (WAP). As a further option, the IP usage may include data transfer utilizing IP. Moreover, the IP usage may include payment for goods or services utilizing IP, and/or communication, i.e. conferencing, utilizing IP.

In another embodiment, the payment may be made from a previous debit account before enabling the debit account in response to the request. As an option, the previous debit account may be adapted for voice communications only. Further, the transfer may be carried out on a mobile unit.

In still another embodiment of the present invention, the wireless network voice communication and the IP usage may be limited based on a user-defined threshold. Such user-defined threshold limitation may expire after a predetermined time period. Further, the user-defined threshold limitation may expire upon receipt of a key. As such, another user may engage in the wireless network voice communication and the IP usage upon receipt of the key.

Optionally, a plurality of users may engage in the wireless network voice communication and the IP usage using a single debit account. Further, the wireless network voice communication and the IP usage may be limited for each of the users based on a single threshold associated with the debit account.

BRIEF DESCRIPTION OF THE DRAWINGS

Prior art

Prior art

DESCRIPTION OF THE PREFERRED EMBODIMENTS

Figure 2:
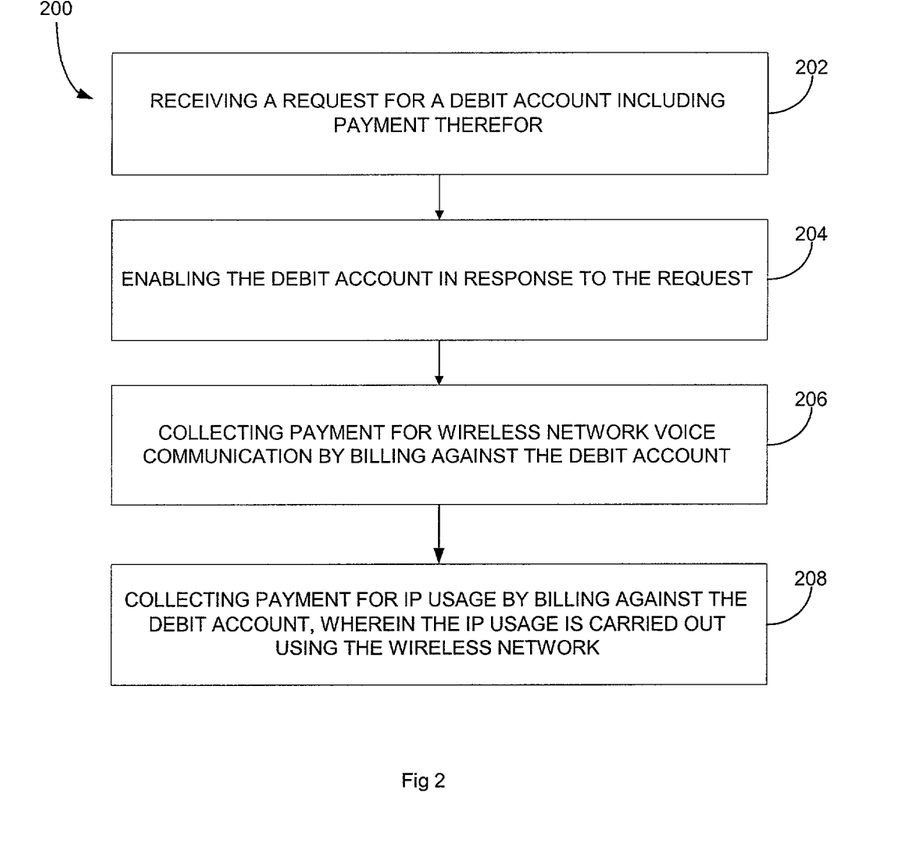
FIG. 2 illustrates a method for providing payment for Internet Protocol (IP) usage utilizing a wireless network.

FIG. 2 illustrates a method 200 for providing payment for Internet Protocol (IP) usage utilizing a wireless network. Initially, in operation 202, a request is received from a user for a debit account. Such request may be received via a telephone or a computer terminal over a network. It should be noted that this may be accomplished via a human operator or an automated mechanism. For example, in one embodiment of the present invention, the request may be received via a mobile cellular hand set, and the debit account may be enabled by a human operator. In the alternative, a form may be submitted by way of ground mail.

In any case, the request may include payment for the debit account. Such payment may be made utilizing a credit account, a bank account, cash or any other desired payment scheme capable of transferring value.

In response to the request received in operation 202, the debit account is enabled. See operation 204. Again, this may be accomplished by a human operator or an automated mechanism. As an option, the debit account may be enabled by providing the user with an identifier, establishing a value of the debit account, and/or any other steps that allow or facilitate payment for IP usage utilizing a wireless network.

During use, payment for wireless network voice communication is then collected by billing against the debit account. Note operation 206. As an option, the wireless network voice communication may use the wireless network via a mobile cellular handset. Further, the wireless network voice communication may use Wireless Application Protocol (WAP), or any other type of communication using the wireless network for voice communication.

Further, in operation 208, payment for IP usage is collected by billing against the debit account. Such IP usage is carried out using the wireless network. As an option, the IP usage may include data transfer utilizing IP. Moreover, the IP usage may include payment for goods or services utilizing IP, and/or communication, i.e. conferencing, utilizing IP. In other embodiments, IP usage may refer to any type of activity involving Internet Protocol.

Figure 3:
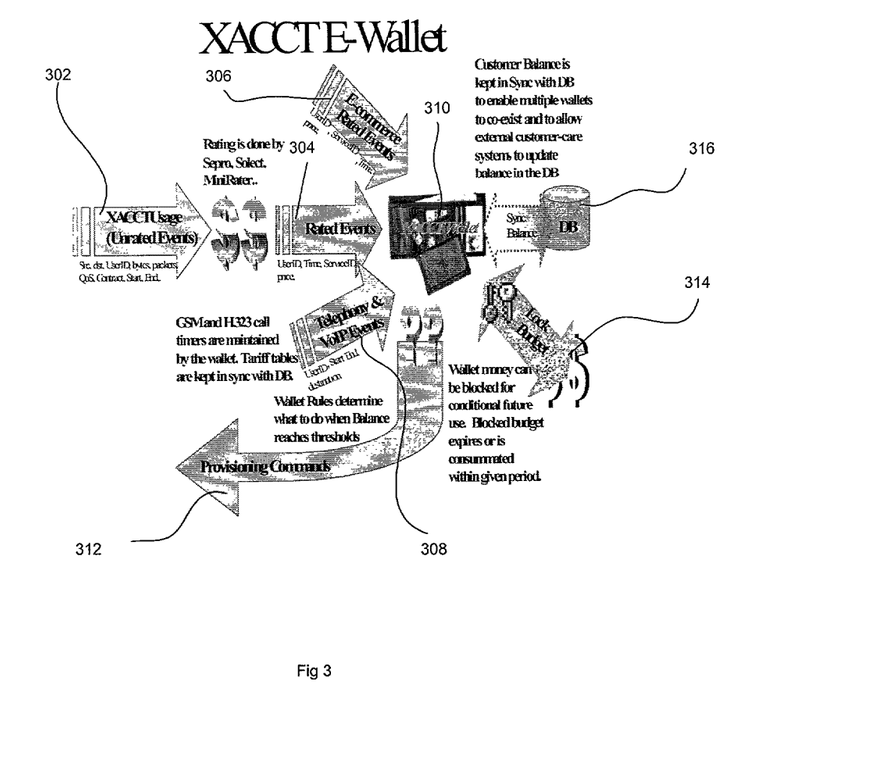
FIG. 3 illustrates a schematic showing various exemplary features associated with the method of FIG. 2 in accordance with one preferred embodiment of the present invention.

FIG. 3 illustrates a schematic showing various exemplary features associated with the method of FIG. 2 in accordance with one preferred embodiment of the present invention. As shown, unrated IP content usage information is collected that is associated with content of the customer communication using the Internet Protocol. Note operation 302. Such content usage information may include, but is not limited to a session's source, destination, user name, duration, time, date, type of server, volume of data transferred, etc.

Thereafter, in operation 304, the unrated events are rated using SEPRO, SOLECT, MINIRATER, or any other type of commercially available rating engine. Such rating engine is capable of outputting a price and optionally a user identifier, time, and/or service identifier given the unrated IP content usage information.

In addition to the unrated IP content usage information, further collected is rated IP content usage information in the form of e-commerce related events. Note operation 306. Similar to the output of the rating engine, the rated IP content usage information associated with the e-commerce related events includes a price and optionally a user identifier, time, and/or service identifier. It should be noted that such rated IP content usage information does not necessarily require a rating engine.

Also collected is call description record information, as indicated in operation 308. Such call description record information is received from a wireless network, and is associated with customer communication over the wireless network. In one embodiment, the call description record information may include conventional CDRs or any other data structure that is collected from a GPRS or other wireless system, and is descriptive of calls that take place thereover. Further information regarding the collection of call description record information will be set forth in greater detail during reference to FIG. 4.

In accordance with operations 206 and 208 of FIG. 2, payment for the identified wireless network voice communication and the IP usage is collected by using the IP content usage information and call description record information to bill against a debit account 310. During the process of collecting payment, various other features may be optionally implemented, as will now be set forth. For example, payment may be received via a credit account. Further, the balance of the debit account may be updated in real-time, and in units of dollars.

As an option, the user may transfer payment from another pre-paid debit account such as one previously established for voice only wireless communications (e.g. 2G wireless networks, GSM, PCS, etc.). This may require provisioning beforehand that links accounts, or requested in real-time by the user. When requested in real-time, the user may using his/her mobile terminal to enter the account and authentication information of his voice only debit account; then requested payment amount is entered. This triggers the transfer of payment from the voice only debit account to the debit account 310.

This option is especially useful during the migration of the current 2G wireless networks to the 3G wireless networks. As 2G systems are currently enjoying high level of interoperability, many 2G pre-paid accounts and related infrastructure exist. The 3G wireless systems initially may not have wide deployment, thus may lack a good infrastructure to offer pre-paid services. This option thus enables a smooth transition of pre-paid services from 2G voice only networks to 3G voice/data integrated wireless networks.

Further, in operation 312, an alert may be sent to a user upon the debit account falling below a predetermined amount. The alert may take the form of an e-mail notification, short telephone, ground mail, etc. As an option, the wireless network voice communication and the IP usage may also be discontinued within a certain time frame upon the debit account falling below a predetermined amount.

In operation 314, the wireless network voice communication and the IP usage may be limited based on a user-defined threshold. Such user-defined threshold may be determined at the time of setting up the debit account in accordance with operations 202 and 204 of FIG. 2, or any other time during use. One example of a threshold may include a certain amount of money in the debit account that may not be used. Of course, other types of thresholds, i.e. communication and usage thresholds, may be used to limit use. As an option, the threshold-based limitation may expire after a predetermined time period. This may allow for at least a portion of the user's money to be temporarily blocked from use.

Further, the user-defined threshold limitation may expire upon receipt of a key. The key may take the form of a personal identification number (PIN), or any other identification mechanism. Similar to the user-defined thresholds, the wireless network voice communication and the IP usage may be optionally blocked for a certain time period before allowing the key to be utilized.

In one embodiment, a plurality of users may engage in the wireless network voice communication and the IP usage using a single debit account. Further, the wireless network voice communication and the IP usage may be limited for each of the users based on a single threshold associated with the debit account. In the corporate environment, a corporate account may be provisioned when personal or corporate balance reaches the threshold. It should be noted that single user and multiple user thresholds may both be executed in the present embodiment.

In order to accomplish this, the amount of wireless network voice communication and the IP usage of each of the users is maintained in a database 316. Accordingly, multiple digital wallet accounts can co-exist in a distributed environment, and a customer care system may refill a wallet with money by accessing the database 316. As an option, high-end databases may be used to provide an overall higher reliability.

By providing the above multiple-user capability, the present invention may be useful for departmental budgeting. For example, a manager may be allowed to control expenses of a common budget of a group of employees. Further, individual employees may be permitted to "overdraft" travel expenditures at the expense of a common money pool. Further applications may involve parents who wish to control family expenditures. In particular, parents would be allowed to explicitly control how their kids can spend money, and budget communication and commodity purchases.

Figure 4:
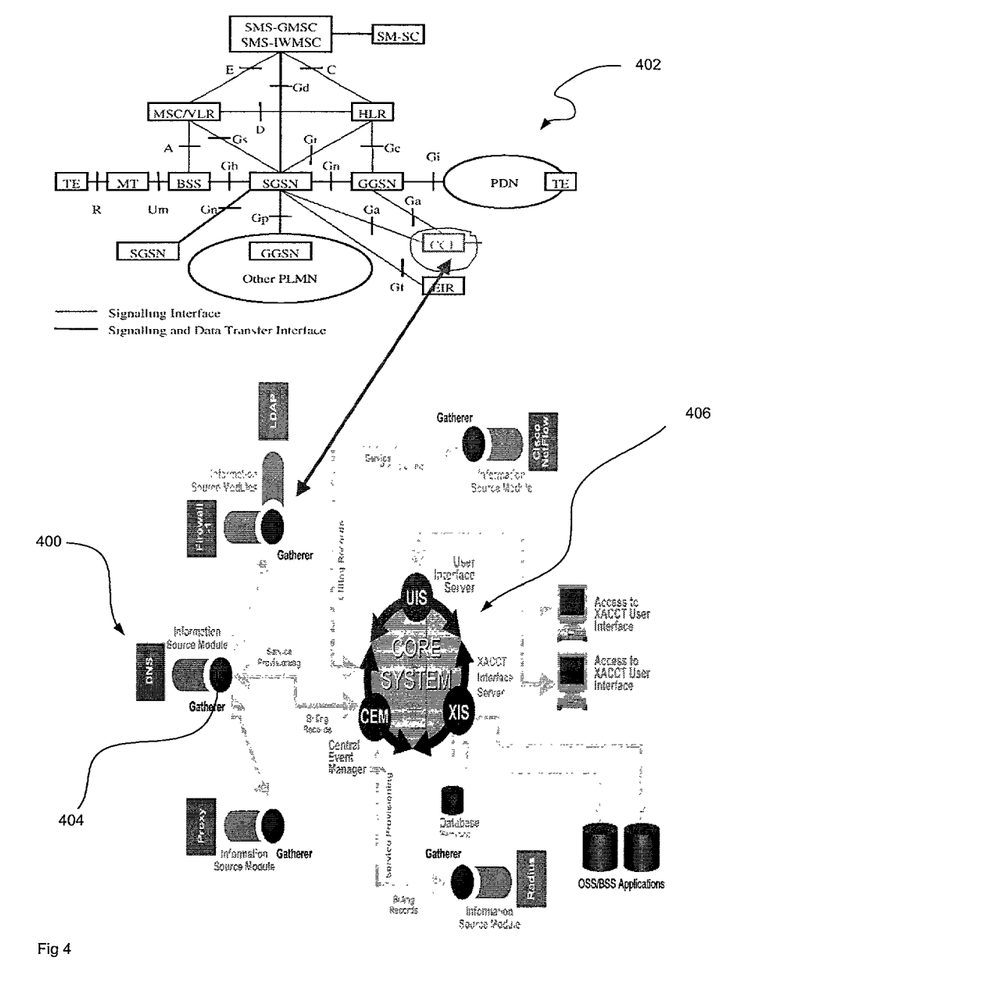
FIG. 4 shows an exemplary accounting system and the manner in which it interfaces with a General Packet Radio Service (GPRS) system for collecting the IP content usage information and call description record information in accordance with FIG. 3.

FIG. 4 shows an exemplary accounting system 400 in accordance with one preferred embodiment of the present invention and the manner in which it interfaces with a General Packet Radio Service (GPRS) system 402 for collecting the IP content usage information and call description record information in accordance with operations 302-308 of FIG. 3. As shown, the exemplary system 400 includes a plurality of data gatherers 404 which are in turn a component of a plurality of information source modules (ISMs). Such ISMs interface with the Serving GPRS Support Node (SGSN) and Gateway GPRS Support Node (GGSN) of the GPRS system 402 for receiving the call description records (CDRs) therefrom.

This may be accomplished by receiving CDRs directly from the SGSN and/or GGSN. In the alternative, the present invention may support the Ga protocol as described by European Telecommunications Standards Institute (ETSI) specs, accepting all types of CDRs produced by SGSN and GGSN. This provides mobility, short message service (SMS), and quality of service (QoS). It should be noted, however, that the accounting system 400 may interface with the GPRS system by any desired means. The accounting system 400 may monitor all the traffic (e.g. user traffic, control/management traffic, network signaling, etc.) carried over any interface in the GPRS system. This enables the accounting system 400 to collect real-time information associated with customer communication over the wireless network as well as IP content usage.

As an option, the system 400 may use the received CDRs to map IP content events to ISMs, resulting in a new type of call description records, XDRs. Such XDR's get fed into rating engines and then to a standard content based billing module 406. It should be noted that as real-time information is gathered by the system 400, various services can be provided based on collected information; e.g. billing, fraud detection, pre-paid service, QoS monitoring, network performance based dynamical provisioning, etc. For more information on how one exemplary content based billing module 406 operates, reference may be made to PCT application WO9927556A2 entitled "NETWORK ACCOUNTING AND BILLING SYSTEM AND METHOD" published Jun. 3, 1999, and which is incorporated herein by reference in its entirety. The present invention may thus use GPRS CDRs in a non-conventional way, mixing them with IP content usage records before feeding them to billing and customer care systems.

Figure 5:
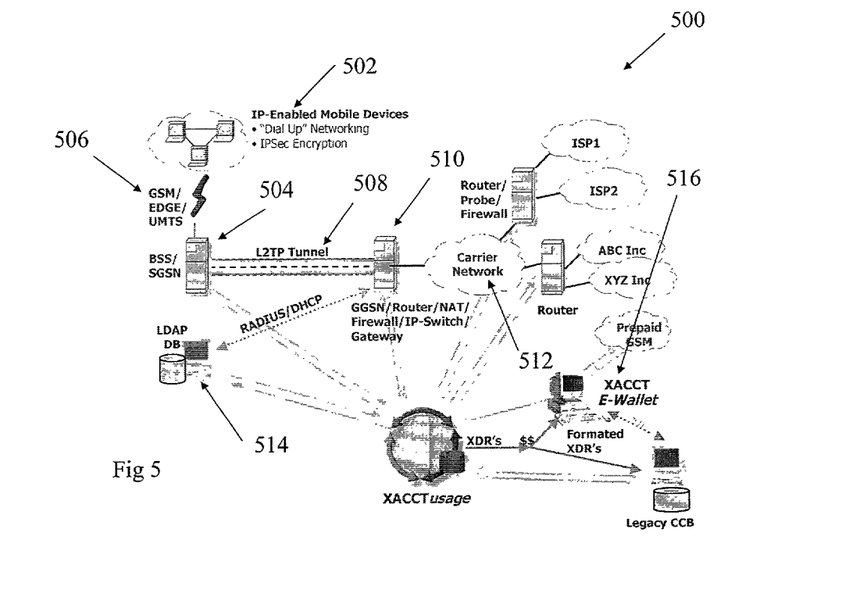
FIG. 5 shows a flow of information using the system of FIG. 4 in accordance with one preferred embodiment of the present invention.

FIG. 5 shows a flow of information using the system 400 of FIG. 4. As shown, a plurality of IP-enabled mobile communication units 502 are provided which are adapted to connect to a base station BSS 504 over a Global System for Mobile Communication (GSM) 506 or any other wireless network.

A packet tunnel 508 is then created from the handset through a SGSN of the BSS 504 to a router 510 logically located in the GGSN. From that router 510, the packets are outputted to the operator's IP network 512. A LDAP Radius server 514 may be provisioned so that whenever mobile communication units belonging to these corporate customers "log-in" to the network, they will be given an IP address.

The present invention may collect the accounting information from the different parts of the network, correlating GPRS info with IP content in a manner set forth in a co-pending patent application filed concurrently herewith under the title "SYSTEM, METHOD AND COMPUTER PROGRAM PRODUCT FOR CHARGING FOR COMPETITIVE IP-OVER-WIRELESS SERVICES" and Ser. No. 09/879,681 and naming Limor Schweitzer as inventor, and which is incorporated herein by reference in its entirety. Converged data records may be sent to be rated and then sent to the debit account mechanism 516.

Figure 6:
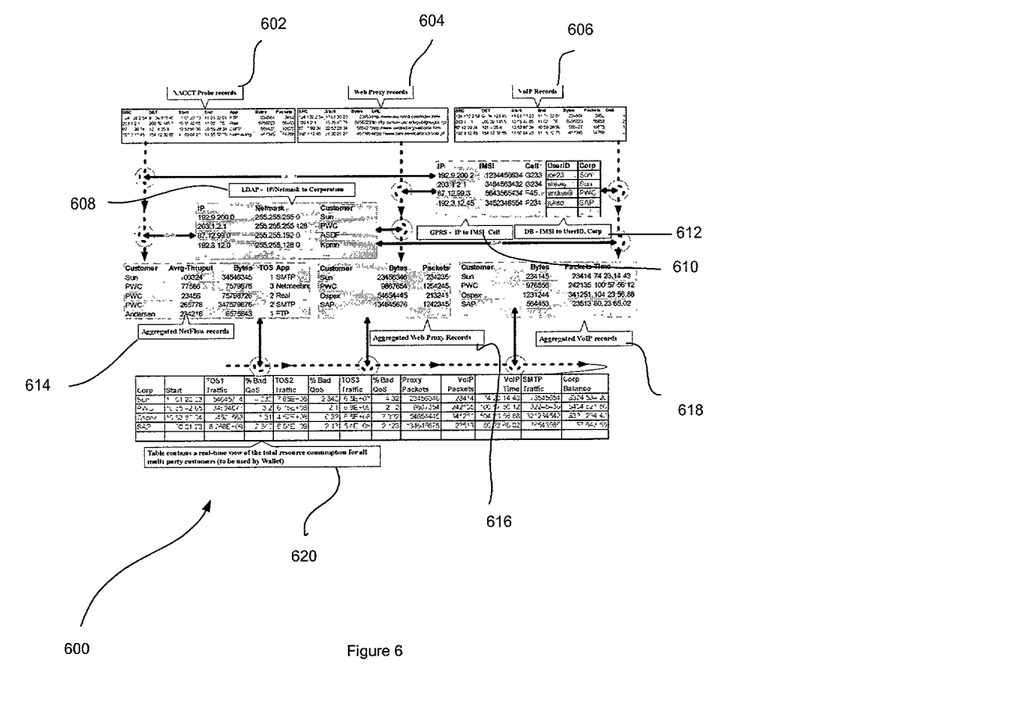
FIG. 6 illustrates a set of records and the ways they are correlated and aggregated to obtain a table that presents a real-time view of the total resource consumption for all multi-party customers.

FIG. 6 illustrates a set of records and the ways they are correlated and aggregated to obtain a table 620 that presents a real-time view of the total resource consumption for all multiparty customers, in accordance with one embodiment of the present invention.

The IP usage information of individual mobile users (typically associated with an IP address) is collected and stored in probe records 602, web proxy records 604, and voIP records 606. By correlating and aggregating the IP usage information with user information stored in an LDAP 608, GPRS 610, and database 612, aggregated IP usage information is obtained that are stored in aggregated netflow records 614, aggregated web proxy records 616, and aggregated voIP records 620. Based on the aggregated usage information, a table 620 is constructed in the manner shown to present a real-time view of the total resource consumption for all multiparty customers.

In use, the table 620 may be rated and billed against the debit accounts set up for these users.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for providing a digital wallet for Internet Protocol (IP) usage utilizing a wireless network, comprising:
   (a) prior to allowing wireless network voice communication and IP usage over a wireless network, receiving a request for a pre-paid debit account including payment therefor;
   (b) prior to allowing the wireless network voice communication and the IP usage over the wireless network, enabling the pre-paid debit account in response to the request;
   (c) collecting payment for the wireless network voice communication over the wireless network by billing against the pre-paid debit account; and
   (d) collecting payment for the IP usage by billing against the pre-paid debit account, wherein the IP usage is carried out using the wireless network.

2. The method as recited in claim 1, wherein the request is received via a mobile cellular hand set, and the pre-paid debit account is enabled by a human operator.

3. The method as recited in claim 1, wherein the wireless network voice communication uses the wireless network via a mobile cellular handset.

4. The method as recited in claim 1, wherein the wireless network voice communication uses Wireless Application Protocol (WAP).

5. The method as recited in claim 1, wherein the IP usage includes data transfer utilizing IP.

6. The method as recited in claim 1, wherein the IP usage includes payment for goods or services utilizing IP.

7. The method as recited in claim 1, and further comprising transferring the payment from a previous pre-paid debit account before enabling the pre-paid debit account in response to the request.

8. The method as recited in claim 1, wherein a balance of the pre-paid debit account is updated in real-time.

9. The method as recited in claim 8, wherein an alert is sent to a user upon the pre-paid debit account falling below a predetermined amount.

10. The method as recited in claim 8, wherein the wireless network voice communication and the IP usage is discontinued upon the pre-paid debit account falling below a predetermined amount.

11. The method as recited in claim 1, wherein the payment is received via a credit account.

12. The method as recited in claim 1, and further comprising the step of limiting the wireless network voice communication and the IP usage based on a user-defined threshold.

13. The method as recited in claim 12, wherein the user-defined threshold limitation expires after a predetermined time period.

14. The method as recited in claim 12, wherein the user-defined threshold limitation expires upon receipt of a key.

15. The method as recited in claim 14, wherein another user may engage in the wireless network voice communication and the IP usage upon receipt of the key.

16. The method as recited in claim 1, wherein a plurality of users may engage in the wireless network voice communication and the IP usage using a single pre-paid debit account.

17. The method as recited in claim 16, and further comprising the step of limiting the wireless network voice communication and the IP usage for each of the users based on a single threshold associated with the pre-paid debit account.

18. A computer program product embodied on a tangible computer readable medium for providing a digital wallet for Internet Protocol (IP) usage utilizing a wireless network, comprising:
   (a) computer code for receiving a request for a pre-paid debit account including payment therefore, prior to allowing wireless network voice communication and IP usage over a wireless network;
   (b) computer code for enabling the pre-paid debit account in response to the request, prior to allowing the wireless network voice communication and the IP usage over the wireless network;
   (c) computer code for collecting payment for the wireless network voice communication over the wireless network by billing against the pre-paid debit account; and
   (d) computer code for collecting payment for the IP usage by billing against the pre-paid debit account, wherein the IP usage is carried out using the wireless network.

19. The computer program product as recited in claim 18, wherein the request is received via a mobile cellular hand set, and the pre-paid debit account is enabled by a human operator.

20. The computer program product as recited in claim 18, wherein the wireless network voice communication uses the wireless network via a mobile cellular handset.

21. The computer program product as recited in claim 18, wherein the wireless network voice communication uses Wireless Application Protocol (WAP).

22. The computer program product as recited in claim 18, wherein the IP usage includes data transfer utilizing IP.

23. The computer program product as recited in claim 18, wherein the IP usage includes payment for goods or services utilizing IP.

24. The computer program product as recited in claim 18, and further comprising computer code for transferring the payment from a previous pre-paid debit account before enabling the pre-paid debit account in response to the request.

25. The computer program product as recited in claim 18, wherein a balance of the pre-paid debit account is updated in real-time.

26. The computer program product as recited in claim 25, wherein an alert is sent to a user upon the pre-paid debit account falling below a predetermined amount.

27. The computer program product as recited in claim 25, wherein the wireless network voice communication and the IP usage is discontinued upon the pre-paid debit account falling below a predetermined amount.

28. The computer program product as recited in claim 18, wherein the payment is received via a credit account.

29. The computer program product as recited in claim 18, and further comprising computer code for limiting the wireless network voice communication and the IP usage based on a user-defined threshold.

30. The computer program product as recited in claim 29, wherein the user-defined threshold limitation expires after a predetermined time period.

31. The computer program product as recited in claim 29, wherein the user-defined threshold limitation expires upon receipt of a key.

32. The computer program product as recited in claim 31, wherein another user may engage in the wireless network voice communication and the IP usage upon receipt of the key.

33. The computer program product as recited in claim 18, wherein a plurality of users may engage in the wireless network voice communication and the IP usage using a single pre-paid debit account.

34. The computer program product as recited in claim 33, and further comprising computer code for limiting the wireless network voice communication and the IP usage for each of the users based on a single threshold associated with the pre-paid debit account.

35. A system, comprising:
a processor for:
    receiving a request for a pre-paid debit account including payment therefor, prior to allowing wireless network voice communication and IP usage over a wireless network;
    enabling the pre-paid debit account in response to the request, prior to allowing the wireless network voice communication and the IP usage over the wireless network;
    collecting payment for the wireless network voice communication over the wireless network by billing against the pre-paid debit account; and
    collecting payment for the IP usage by billing against the pre-paid debit account, wherein the IP usage is carried out using the wireless network.

36. A method for providing a digital wallet for Internet Protocol (IP) usage utilizing a wireless network, comprising:
    (a) prior to allowing wireless network voice communication and IP usage over a wireless network, receiving a request for a pre-paid debit account from a user utilizing a mobile communication unit;
    (b) prior to allowing the wireless network voice communication and the IP usage over the wireless network, receiving an account identifier associated with a previous account of the user which is adapted solely for voice communications;
    (c) prior to allowing the wireless network voice communication and the IP usage over the wireless network, authenticating an identity of the user;
    (d) prior to allowing the wireless network voice communication and the IP usage over the wireless network, enabling a pre-paid debit account;
    (e) prior to allowing the wireless network voice communication and the IP usage over the wireless network, transferring monies associated with the previous account to the pre-paid debit account;
    (f) collecting payment for the wireless network voice communication over the wireless network by billing against the pre-paid debit account; and
    (g) collecting payment for the IP usage by billing against the pre-paid debit account, wherein the IP usage is carried out using the wireless network.

* * * * *